United States Patent Office 3,373,756
Patented Mar. 19, 1968

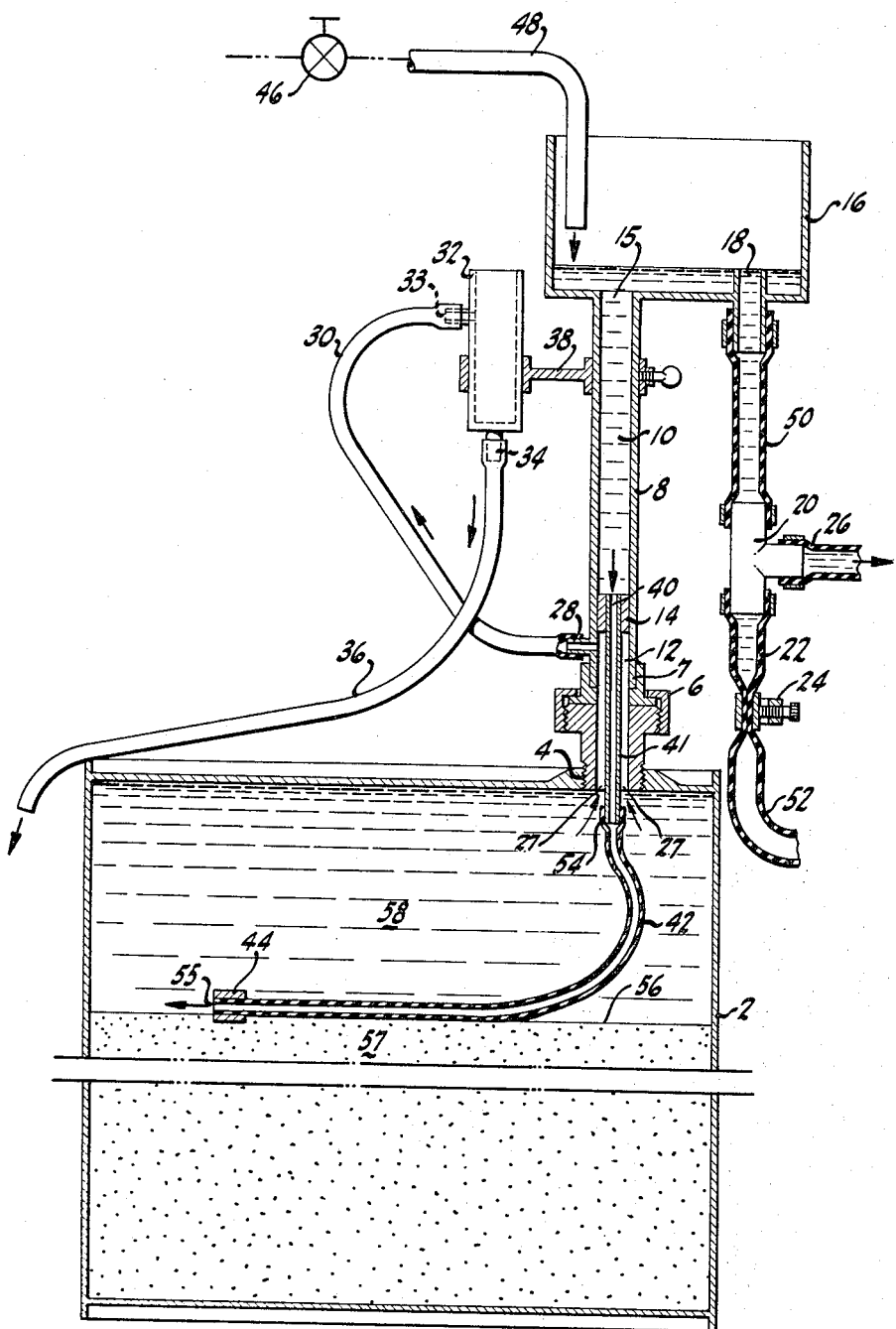

3,373,756
APPARATUS AND METHOD FOR FEEDING CHEMICALS INTO LIQUID SYSTEMS
Herman J. Franz, Richmond, Calif., assignor to Garratt-Callahan Company, Millbrae, Calif., a corporation of California
Filed June 28, 1966, Ser. No. 561,227
6 Claims. (Cl. 137—1)

ABSTRACT OF THE DISCLOSURE

An apparatus and method in which a water-tight container of soluble chemicals has an influent conduit with a flexible tube extending into the container, an effluent conduit, and chemicals in the container which are dissolved at a controlled rate by adjusting the liquid head level of liquid passing into the container to control the rate of flow of the solvent through the container.

---

It is frequently necessary to add a solid chemical composition at a predetermined rate to a liquid system. For example, solid chemical compositions are added to boilers, evaporative condensers, cooling towers, and other aqueous systems, such as systems for drinking water. During operation of the system, either the chemicals are consumed, lost through bleed or blowdown, or the solution diluted. Frequently, the chemicals are provided as a solid in a drum. It is therefore desirable during the operation of the liquid system to transfer the solid chemical compositions from the drum to the system at a predetermined rate so as to maintain a relatively constant concentration of the chemicals in the system.

The problem is readily exemplified in treating the water passing through a cooling tower. A relatively constant concentration of various chemicals is maintained in the water in order to minimize corrosion and scale formation in the cooling system. Make-up water is continually being added to the cooling tower and diluting the chemical concentration, while at the same time, the chemicals are being consumed or bled from the system to further reduce the concentration. Since a drum of the chemical composition can satisfy the needs of an average cooling system for a substantial period of time, a satisfactory apparatus must operate efficiently over long periods with only minor maintenance or supervision. Moreover, the apparatus should be free of moving parts and avoid impeding the flow of liquid.

It is an object of this invention to provide an apparatus for efficiently transferring a solid water soluble chemical composition at a predetermined rate into an aqueous system.

It is a further object of this invention to provide an apparatus with minimal opportunity for failure, having minimal requirement for maintenance or supervision and which is capable of maintaining a predetermined flow of a dissolved solid chemical composition.

Other objects and many of the attendant advantages of this invention will be readily appreciated as the same becomes better undestood by reference to the following detailed description when considered in connection with the accompanying drawing wherein:

FIG. 1 is a vertical cross-section of a preferred embodiment of the invention.

The apparatus of the invention provides a means of controlling the rate of flow of influent of a solvent at a solid liquid interface, and thus the rate of flow of the effluent containing the dissolved chemical compositions. Affixed to a drum containing a solid chemical composition in a leakproof manner is a means for introducing a liquid influent close to the surface of the solid chemical composition in a plane substantially parallel to said surface, and for removing a liquid effluent containing the dissolved chemical to a height intermediate the top of the container and below the height of the influent or head level. By varying the differential level between the influent and the effluent, the hydrostatic pressure can be varied, providing control of the rate of flow. By avoiding the use of moving parts, all the parts being stationary, and using relatively wide parts and large diameter conduits, the likelihood of any failure is greatly minimized and little, if any, supervision or maintenance required. Moreover, the apparatus is readily portable, easily attachable to a container such as a drum, and the flow rate is easily and rapidly set and controlled for long periods of time.

Reference is now made to the drawing. Drum 2 has a threaded opening 4 which is closed during shipment by a plug, not shown. Any water-tight conventional drum container is employed which may be completely closed except for the opening 4. Attached to the opening 4 in water-tight relationship is a union generally indicated as 6, or other fastening means, which is bonded at 7 to a rigid conduit 8. Conduit 8 is divided into an upper chamber 10, and a lower chamber 12 by means of divider 14. The relative size of the chamber is not significant. The upper portion of the rigid conduit 8 opens at opening 15 into a constant level chamber 16 which has an overflow opening 18. The overflow opening 18 is at a somewhat higher level than the upper conduit opening 15. The overflow from the constant level chamber 16 flows through T 20 and conduit 22 to return to the system, the rate of flow being controlled by valve 24. A screw clamp is satisfactory, although more sophisticated adjustable valves may be used. If desired, a portion of the overflow may be led through conduit 26 as a bleed or blowdown for waste from the system. The waste bleed arrangement is used in cooling systems, and it may be controlled by the valve 24. Partially closing valve 24 increases the flow of water through conduit 26 thereby increasing system bleed.

Lower chamber 12 communicates with the drum at annular opening 27 and has an exit port 28 disposed above the connection to the union 6. Exit port 28 is connected by flexible tubing 30 to the level control bulb 32 at inlet port 33. The level control bulb 32 has an exit 34 which is connected by a flexible conduit 36 to the system to which the effluent is fed. A clamp 38 is provided which may be adjusted to any height to control the height of the level control bulb, thus controlling the differential between the height of the liquid level in the constant level chamber 16 and the height of the liquid at inlet port 33 of the level control bulb 32.

The upper chamber 10 communicates with the interior of drum 2 through an opening 40 in the divider 14 in which is secured conduit 41. Flexible tubing 42 is connected to and extends from conduit 41, and the tubing is weighted at the exit end with weight 44. Tubing 42 is sufficiently long so as to be able to follow the solids level to the bottom of the drum as the chemicals are dissolved. The weight 44 holds the flexible tube close to the surface 56 of the solid chemicals 57 and in position to feed the inflowing liquid in a plane substantially parallel to the surface.

In operating the apparatus of this invention a source of liquid is provided which may be constant or intermittent. While the apparatus is useful in connection with water flowing to boilers, condensers and water systems such as those for supplying drinking water, it may be exemplified for all purposes by describing it when used for treating water supplied to a cooling tower.

Most drums have a threaded opening, depicted in the figure as 4. The union 6 is screwed onto the threaded opening so as to provide a water seal. A gasket, not pictured in the figure, may be used. The union should be strong enough to maintain the apparatus in a fixed vertical position.

A valve or other control means may be used for providing water to the constant level chamber. The type of valve or control which is used will depend to some degree upon whether the water supplied to the constant level chamber 16 is make-up water or recirculating water. When make-up water is used, a float switch, flow switch, total dissolved solids controller or similar device can be used to activate a flow of make-up water. The float switch, flow switch, total dissolved solids controller or similar devices could also be used to activate recirculating water but normally this is not done. On the other hand, with recirculating water, a valve 46 or other control means may be used, which may be set so as to provide a constant flow of water through conduit 48 into the constant level chamber 16. The rate of flow is maintained so as to have an overflow as long as water is flowing through the apparatus. The overflow water which does not pass through drum 2 flows through opening 18 and conduit 50 into T 20 and can be divided into two streams. By passing through conduit 22, the rate of flow being controlled by valve 24, the overflow water is returned through conduit 52 to the system. The second portion of the split stream passes through conduit 26 to waste as system bleed. The bleed rate is controlled by screw clamp 24.

The height of the level control bulb 32 is set by means of the adjustable clamp 38 to control the rate of flow of water through the drum. The height of the level control bulb 32 will have to be set in relation to different chemical compositions in the drums, and with respect to the concentration of chemical desired in the flowing system. However, once equilibrium is established and the desired rate of flow achieved by adjusting the differential head level betweeen the liquid in constant level chamber 16 and port 33 of control bulb 32, the differential head level will generally not have to be readjusted unless other conditions, such as the system load or temperature, are varied.

As already indicated, the water is preferably fed into the constant level chamber 16 at a rate which maintains an overflow so that a constant head level is maintained during the operation. Of course, with intermittent operation, when water is no longer being fed to the apparatus, there will be no overflow and the water lever will drop to that of the level control bulb 32. The water which dissolves the solid chemical composition flows from constant level chamber 16, into the upper chamber 10, then down through opening 40 in the divider and conduit 41. It then flows past the union 54 through conduit 41 and into flexible tube 42 and then through flexible tube 42 in drum 2. The flexible tube 42 is weighted at the end by a weight 44 or a distribution manifold, resting at the solid liquid interface 56. The water emerges through opening 55 at the interface 56 in a plane substantially parallel to the surface of the solid. It is found that at the rate of flow required, the solid retains a relatively level interface as it is dissolved.

Initially, the water rapidly fills up the empty space in the drum driving the air out of the drum, and the solid chemical composition 57 dissolves into the water. The solids which are used are generally chemicals which are not infinitely soluble in water, nor do they have extremely high heats of solution. Thus, as the system operates, a relatively constant amount of chemical is dissolved into the flowing water to maintain a relatively constant concentration of the chemicals. The liquid 58 in the drum flows up into the chamber 12 and out through port 28 and conduit 30 through bulb inlet 33 into the level control bulb 32. The water when flows through the level control bulb out through port 34 and conduit 36 to the cooling tower.

While the apparatus may be constructed from various materials, the rigid conduit constant level chamber and level control bulb are satisfactorily constructed from glass or synthetic resins such as polymethyl methacrylate. Any inert commercially available flexible tubing, such as tygon or rubber, may be utilized for flexible tubing 30 and 42.

As an example of the use of the apparatus of this invention in conjunction with a water cooling system, the apparatus was attached to a drum containing sodium bisulfate. By running 31 pounds per hour of water through the drum, 0.4 pound of the composition was fed per twenty-four hours. By increasing the flow to 77 pounds of water per hour, two pounds of the composition were fed per twenty-four hours and with a flow of 147 pounds of water per hour, six pounds of the composition were fed per twenty-four hours. The dissolved sodium bisulfate serves to control corrosion and scale formation in the system.

A different corrosion and scale reducing composition comprising 45 percent sodium bichromate, 45 percent zinc sulphate, and 10 percent inert material in percent by weight dissolves at a different rate with the same apparatus. With a water flow rate of 26 pounds per hour through the apparatus, 0.4 pound of formula was fed in twenty-four hours, while a water flow rate of 58 pounds per hour fed 1.6 pounds of the composition per twenty-four hours. When the water flow rate was increased to 83 pounds per hour, 4.1 pounds of the composition was fed into the cooling system in twenty-four hours.

The apparatus of this invention provides a simple and convenient means for the control feeding of solids to a system. Furthermore, the apparatus has no moving parts, minimizing the possibility of failure and reducing maintenance and supervision requirements. The apparatus provides a significant improvement over earlier apparatuses which are complex and cumbersome, generally requiring the transfer of the solids from the drum to a different container.

Obviously, many other modifications and variations of the present invention are possible in light of the above teaching. It is therefore to be understood that within the scope of the appended claims, the invention may be practiced otherwise than specifically described.

What is claimed is:

1. Apparatus for feeding a solid chemical composition from a closed container into an aqueous system at a controlled rate by dissolving the composition in water and introducing the resultant solution into the aqueous system to be treated, which apparatus comprises a constant level chamber having overflow means which limits the level of water in the chamber and a port for water flowing into said container; a flow directing conduit having a water-tight connection with said container, dividing means separating said flow directing conduit into first and second chambers, said first chamber communicating with said constant level chamber and with a flexible tube extending into said container, and said second chamber communicating with said container and having an exit port, an open bulb having an exit port and an inlet port, said inlet port connected to said second chamber exit port by flexible conduit means; said bulb exit port connected by conduit means to the system to be treated, and means for varying the liquid head level between the water level in the constant level chamber and the water introduced into said bulb to provide hydrostatic control of the rate of flow of the liquid.

2. The apparatus of claim 1 wherein said flexible tube extending into said container is sufficiently long to follow the solid composition level to the bottom of the drum and to introduce the water in a plane substantially parallel to the solid chemical composition surface as the composition dissolves.

3. The apparatus of claim 1 wherein an adjustable clamp permits the height of the bulb to be varied to control the liquid head level between the water level in the constant level chamber and the water flowing into the bulb inlet port.

4. The apparatus of claim 1 wherein said first chamber is an upper chamber, said second chamber is a lower chamber, and said first chamber communicates through an opening in the dividing means of the flow directing conduit with the flexible tube which extends into the container.

5. The apparatus of claim 1 wherein said overflow means has one conduit for returning overflow water to the aqueous system to be treated and another conduit directing overflow water out of the system for bleed control.

6. The method of transferring a solid water soluble chemical composition at a controlled rate from a water-tight container into solution in a flowing aqueous system to be treated which comprises connecting to said container in water-tight communication with the interior of the container an influent conduit and an effluent conduit, said influent conduit having at its upper end means for retaining a predetermined level of water and at its lower end a flexible tube extending into said container, and said effluent conduit adapted to carry water out of said container to said aqueous system to be treated; causing water to flow into said container through said influent conduit and said flexible tube to dissolve said chemical composition and then flow out of said effluent conduit; and adjusting the height of the water flowing out of said effluent conduit to vary the liquid head level between the influent conduit and the effluent conduit and thereby control the rate of flow of water through the container to establish the rate at which the chemical composition is dissolved and metered into the flowing aqueous system.

References Cited

UNITED STATES PATENTS

| | | | |
|---|---|---|---|
| 854,522 | 5/1907 | Newman | 137—577 XR |
| 1,297,210 | 3/1919 | MacKenzie | 137—577 XR |
| 2,067,328 | 1/1937 | Lux | 23—271 XR |
| 2,738,323 | 3/1956 | Tepas | 23—272 |

M. CARY NELSON, *Primary Examiner.*

R. J. MILLER, *Assistant Examiner.*